3,034,764
DAMPING MEANS

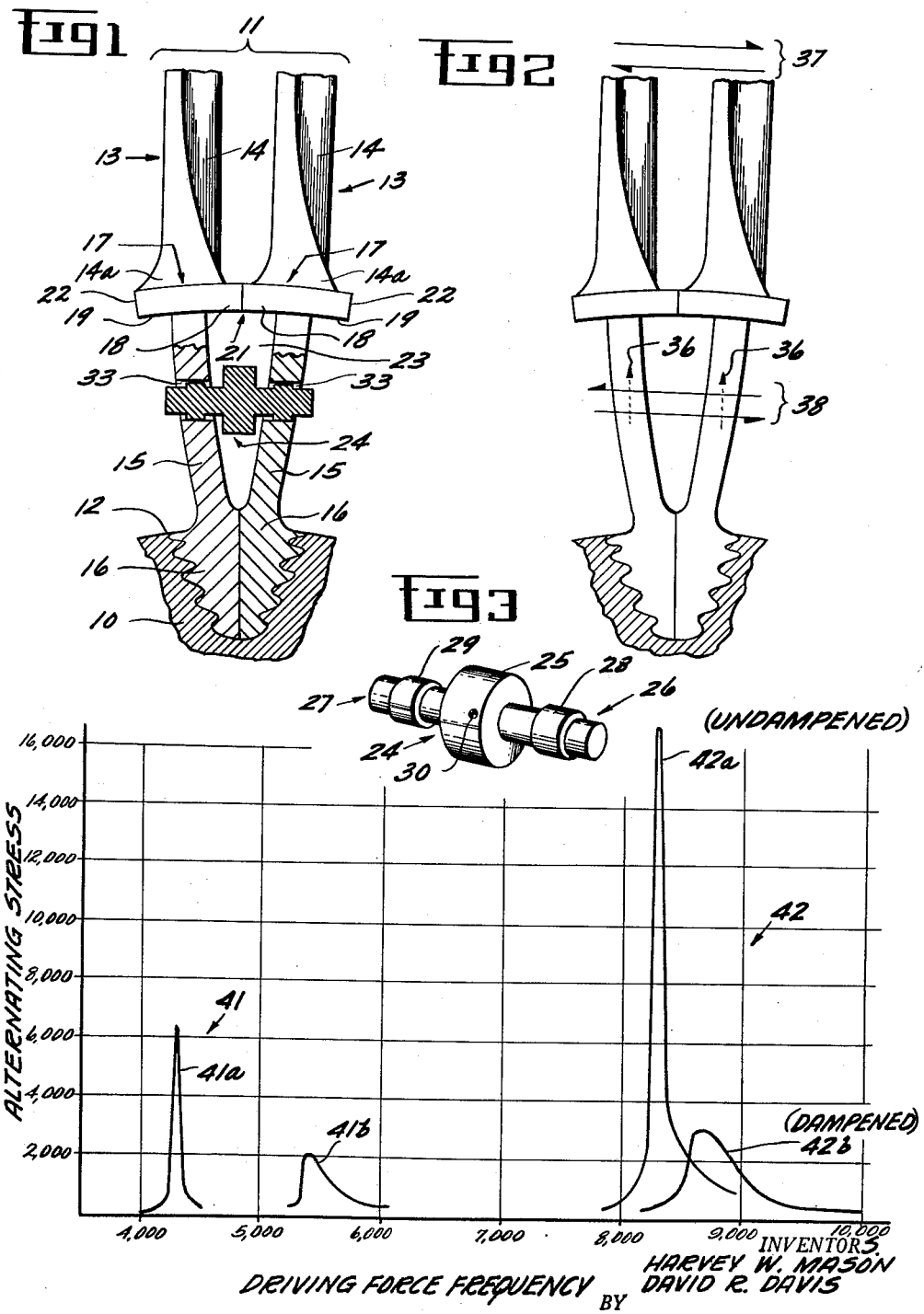

David R. Davis and Harvey W. Mason, Cincinnati, Ohio, assignors to General Electric Company, a corporation of New York
Filed Dec. 18, 1959, Ser. No. 860,524
4 Claims. (Cl. 253—77)

This invention relates to means for decreasing vibratory stress in elongated or flexible-shank turbine buckets and, more particularly, to a system for damping vibration in such buckets where they are of the so-called "dual" bucket variety.

It is well known that turbine rotor buckets are often subject to vibration during operation of the turbine and that such vibration can become severe enough to cause the buckets to fail. In addition, small but definite variations in size and configuration, as a result of manufacturing quirks, cause each bucket to have a number of vibratory modes which are excited by airflow past the airfoil. Where the vibration is likely to become too severe some method of damping must be supplied.

Damping has been found to be particularly necessary in the case of turbine rotor buckets having relatively long and flexible shanks. Moreover, the problem of damping excessive vibration is even more acute when use is made of the so-called "dual" bucket, i.e., a bucket in which a pair of individual buckets whose shanks are symmetrical mirror-images of each other are placed back-to-back, with the pair of buckets being affixed to the rotor in a single groove in the periphery thereof.

If a series of dual buckets are utilized in the construction of a turbine rotor, it has been found that the buckets may vibrate either out-of-phase or in-phase with each other. Further, it has been learned that previously suggested damping methods, e.g., "tying" adjacent dual buckets together, will not completely solve the problem of vibration since it is possible to have a condition in which there is no relative motion between the adjacent dual buckets, yet there will be relative movement between the individual buckets of a dual bucket.

In rotors employing dual buckets, it has been thought possible to satisfactorily eliminate vibratory stress by merely utilizing an "interface" damping system, i.e., a system which very broadly comprises providing laterally-extending abutting surfaces between the individual buckets of each pair, and/or between adjacent dual buckets. Such an arrangement, however, will not completely solve the vibration problem in a case where dual buckets having the above-mentioned relatively long and flexible shanks are utilized. This is because there is a tendency for the elongated shanks to vibrate back and forth out-of-phase, i.e., in a "tuning fork" mode, with the bucket airfoil tips also vibrating back and forth out-of-phase. At the same time, however, little relative motion is experienced between the laterally-extending abutting surfaces of the buckets so that in the out-of-phase vibratory mode common to a flexible-shank dual bucket, the tip and shank of one bucket (of the pair) will move alternatingly in and out each going in the opposite direction at any given instant, while the tip and shank of the other bucket will move out-of-phase to the first-mentioned tip and shank, respectively, all about the locus of the interface or abutting surfaces as a pivot point. Since the abutting surfaces do not move relative to each other to any great extent, any possibility of out-of-phase damping action at this point is limited.

Therefore, although the interface system has been found advantageous for some applications, e.g., where in-phase vibration is the primary concern, a more complete damping system is needed when both the in-phase or "soldiering" and the out-of-phase or "tuning-fork" vibrational modes are likely to be encountered. Moreover, at any given frequency, due to contact between the abutting surfaces, the buckets may vibrate as a pair with either the in-phase or the out-of-phase mode predominating at any one time. This makes it difficult to reduce excessive vibratory stress in a dual bucket by merely designing for one type of vibration.

Accordingly, an object of our invention is to provide a damping system for use with a flexible-shank dual bucket, which system will act to reduce vibratory stress.

A further object of our invention is to provide damping means for use between the shanks of a pair of flexible-shank buckets of a dual bucket, which means will reduce both in-phase and out-of-phase vibration between the buckets.

Briefly, in one embodiment of our invention we provide for use with a turbomachine rotor, the combination of a dual bucket, the dual bucket comprising a pair of buckets having flexible, mirror-image shanks, the bucket being affixed back-to-back in a single groove in a turbine rotor, and an in-phase and out-of-phase damping system including laterally-extending abutting surfaces on the buckets, and a dampener loosely positioned between the shanks and adapted to react to centrifugal force to exert an equivalent normal force on each shank to help dissipate vibratory stress in and between dual buckets.

While the specification concludes with claims specifically pointing out and distinctly claiming the subject matter which we regard as our invention, it is believed that the invention will be better understood from the following description taken in connection with the accompanying drawings in which:

FIG. 1 is an elevation view, partly in section, of a dual bucket including our novel damping means, and FIG. 2 is a schematic drawing indicating the direction of in-phase and out-of-phase vibrations in an elongated or flexible-shank dual bucket, and the normal reactive forces exerted by the dampener, and FIG. 3 is a pictorial drawing of an embodiment of our dampener, and FIG. 4 is a graph comparing damped and undamped oscillations in a typical dual bucket utilizing our invention.

Referring now more particularly to FIG. 1, shown therein is a segment 10 of the periphery or rim of a typical turbine rotor disk. Indicated generally at 11 is a dual bucket adapted to be received in a slot 12 in the disk periphery. The dual bucket comprises a pair of individual buckets, indicated generally at 13—13, each of which includes: an airfoil section 14; an elongated, flexible shank section 15; a root section 16; and a platform section, indicated generally at 17.

The platform section of each bucket 13 extends laterally at 18 and 19, abutting at 21 to enable the buckets to vibrate as a paired system. The lateral extensions 18 also maintain the spacing of the bucket shanks while forming a recess 23. Since they will be in sliding contact, the abutting surfaces at 21 create a damping action to help control in-phase vibration.

As previously mentioned, the fundamental vibratory mode of a turbine rotor bucket may be different at different rotational speeds. Since this is especially true of the dual bucket, at a given rotor speed the vibratory stress in a group of such buckets may be of either the in-phase or the out-of-phase variety. If the vibration is the in-phase type, the dual buckets will tend to bend first one way and then the other "in step." Excessive vibration of this type, however, may be damped by means of a second surface 22 on each bucket platform 17. These surfaces, when in abutment with like surfaces on opposing buckets of adjacent dual buckets form the interface damping system in conjunction with the surfaces at 21. But, as has been pointed out, where elongated, flexible-shank buckets are used in the dual bucket, the out-of-phase mode of vibration may be present, wherein both airfoil tips approach each other while, at the same time, both shanks move away from each other.

These relative movements of the bucket shanks and airfoil tips are illustrated in FIG. 2. Shown therein, in addition to the dotted arrows depicting the normal damping forces described below, are the alternating out-of-phase movements of the tips and shanks, indicated by the solid arrows at 37 and 38, respectively. When individual buckets of a dual bucket vibrate in this manner, the interface system alone is insufficient to reduce the vibratory stress, as has been pointed out. This necessitates the use of an out-of-phase damping means.

Illustrated in FIG. 3 is one embodiment of our novel damping means adapted to be contained in the recess 23. Shown therein is a damper-pin 24, preferably of one-piece construction and cylindrical in configuration, but with various portions of the cylinder having different diameters. The pin includes a relatively large central portion 25, a pair of arms indicated generally at 26 and 27 and extending from either side of the central portion along an axis thereof, and a pair of raised bearing surfaces 28 and 29 positioned on the arms and equi-distant from the centroid 30 of the pin.

It will be seen from the drawing that the diameter and length of the various portions of the pin 24 have been selected so that the centroid 30 of the entire pin coincides with the centroid of the largest, or central, portion 25. In other words, the pin is symmetrical, with the length and diameter of each of the arms 26 and 27 being equal, as is also true of the bearing surfaces 28 and 29.

The portion of the arms extending beyond the bearing surfaces 28 and 29 fit inside openings or passages 33—33 in the bucket shanks in order that the damper-pin may be contained in the recess. The bearing surfaces, although larger in diameter than the arms, are also adapted to be received in the shank passages for relative movement therein. The walls of the passages 33—33 are designed to mate with the bearing surfaces 28 and 29; therefore, with use of the damper-pin shown in FIG. 2 the passages should be circular. It is to be understood, however, that the invention is not limited to the specific embodiment of the damper-pin described herein and that any suitably shaped dampener may be utilized as long as the shape prevents the dampener from falling from between the shanks, and the mating surfaces provided on the raised bearing portions cooperate with similarly-shaped openings in the prescribed manner. In addition, more than one dampener may be utilized, with the necessary openings being provided, of course.

From the above description, it can be realized that the reactive force the damper-pin will develop as the rotor spins will be a function of the distance from the center of gravity of the pin to the point of reaction, as well as a function of the coefficient of friction between the contacting surfaces of the pin and the walls of the passages 33. Equally recognizable, then, is the fact that if the reaction point could vary appreciably in and out towards the center of the dual bucket, damping effectiveness could vary. The position, shape, and size of the raised bearing surfaces 28 and 29 and the configuration of the passages 33—33, therefore, insure two things, namely: (1) that the reactive forces, indicated in FIG. 2 by the dotted arrows 36—36, imposed on the shanks due to the effect of centrifugal force on the enlarged central portion 25 of the damper-pin, will be normal to the axis of the passages, and (2) that the normal reaction generated by surface 28 will equal that generated by surface 29.

To put it another way, because the bearing surfaces 28 and 29 are larger than the supporting arms and because the surfaces are positioned equi-distant from the centroid of the pin, the points at which the reactions are taken out are localized, and the normal forces exerted on each of the shanks are in equalization. This latter feature is especially important since with an unequal reaction at 28 and 29, slippage would occur only at the point of least reaction. If such were the case, only this smallest reaction would be useful to dampen the out-of-phase vibration by means of the frictional contact between the bearing surface and the mating wall of the corresponding passage 33. Thus, damper-pin design may be said to be critical to the extent that some means must be provided to control the points at which the pin contacts the bucket shanks.

FIG. 4 is a diagram showing, for various driving force frequencies, which are a function of rotor speed, some of the effects of the damping of vibratory stress in a dual bucket utilizing our invention. The ordinate of the graph illustrates the stress in pounds per square inch as a function of the driving force frequency, the latter being indicated by the abscissa of the graph. The curves indicated at 41 show typical stresses for an in-phase vibratory mode. The curve at 41a is an illustration of stress where an interface damping system is not used and curve 41b is an illustration of stress when such a system is in use. The curves 42 at the right-hand side of the graph are examples of typical out-of-phase vibratory stresses. The curve at 42a is an illustration of undamped out-of-phase vibratory stress and the curve at 42b is an illustration of the reduced stress accompanying use of our invention.

What we claim as new and novel and desire to secure by Letters Patent is:

1. The combination of: a turbomachine rotor; a plurality of dual buckets, each dual bucket comprising a pair of buckets, each having an airfoil, a platform connected to said airfoil, and an elongated flexible shank connected at one end to said platform, the opposite end of the shank having means to mount the bucket together with the other bucket of said pair in a single groove in the rotor, and the bucket platforms having lateral extensions ending in abutting surfaces which dampen in-phase vibration between the pair of buckets; spacing means integral with said platforms to space said shanks to form a recess therebetween; a pair of aligned openings having continuous walls in said shanks; and out-of-phase damping means located between said shanks, said damping means being supported in said openings and comprising a cylinder having an enlarged central portion, a pair of arms extending axially of said enlarged central portion, and a raised surface equi-distant from said central portion on each of said arms, said surfaces acting on the walls of said openings to exert equal normal forces on said shanks which vary dependent on the magnitude of the centrifugal forces imposed on said cylinder during operation of said rotor.

2. For use with a turbomachine rotor, the combination of a plurality of dual buckets, each dual bucket including a pair of airfoils, a pair of flexible shanks having oppositely-disposed aligned openings with continuous walls therein, and means to maintain said shanks in a spaced apart relationship, and a dampener, said dampener having a cylindrical relatively heavy central portion, an arm extending from either side of said central portion along an axis thereof, said arms being of equal size and weight and being received in said shank openings to support said cylinder therebetween, and a raised bearing surface on each of said arms, said bearing surfaces being located equi-distant from the centroid of said central portion, the surfaces being symmetrical and operative to frictionally engage the walls of said openings during operation of said rotor to exert forces on said walls which are normal to said shanks and of equal but varying strength, and which are sufficient to dissipate excessive out-of-phase vibratory stresses occurring in said dual buckets.

3. A damping system for use with a turbomachine rotor having a plurality of dual buckets affixed thereto, said buckets having spaced-apart elongated flexible shanks, comprising: means integrally formed with the dual bucket shanks for dampening in-phase vibration between the shanks and between adjacent dual buckets; and at least one dampening member, said member having axially-extending means adapted to be loosely received in a pair of aligned openings having continuous walls in the dual bucket shanks for supporting said member therebetween, the member including an enlarged central portion, and a pair of raised bearing surfaces positioned on said axially-extending means and equi-distant from said central portion, said surfaces being so configured that during operation of the rotor, the centrifugal forces acting on said dampening member will cause equal but varying normal forces to be exerted on said shanks, said normal forces being sufficient to dissipate excessive out-of-phase vibratory stresses occurring in the dual buckets.

4. A damping system for use with dual buckets having elongated, flexible shanks and affixed to a turbomachine rotor, said system comprising: a pair of oppositely-disposed lateral extensions integrally formed with the bucket shanks, said extensions being adapted to abut like extensions on adjacent buckets to dampen in-phase vibration between adjacent dual buckets; mutually-confronting extensions cooperating to space the bucket shanks to form a recess therebetween having walls normal to the longitudinal axis of said shanks; and a plurality of dampeners adapted to be loosely contained in said recess, each of said dampeners including a relatively heavy central portion, a pair of undercut arm portions extending from opposite sides of said central portion, and a bearing surface on each of said arm portions, said surfaces being equi-distant from the centroid of said central portion, said dampeners reacting under the influence of the centrifugal forces generated during rotor operation to exert forces through said bearing surfaces to said walls to dampen excessive out-of-phase vibration in said dual buckets.

References Cited in the file of this patent

UNITED STATES PATENTS

| | | |
|---|---|---|
| 1,618,285 | Kasley | Feb. 22, 1927 |
| 2,141,401 | Martinka | Dec. 27, 1938 |
| 2,967,043 | Dennis | Jan. 3, 1961 |

FOREIGN PATENTS

| | | |
|---|---|---|
| 153,004 | Sweden | Jan. 10, 1956 |
| 1,165,795 | France | June 2, 1958 |